United States Patent [19]

Simon et al.

[11] Patent Number: 5,186,838

[45] Date of Patent: * Feb. 16, 1993

[54] CHROMATOGRAPHIC PACKING MATERIAL HAVING FUNCTIONALIZED POLYMERIC COATING ON A SUBSTRATE

[75] Inventors: Ethan S. Simon; Kevin B. Holland; Christopher McClanahan, all of Charlottesville, Va.

[73] Assignee: Biotage Inc., Charlottesville, Va.

[ * ] Notice: The portion of the term of this patent subsequent to Dec. 1, 2009 has been disclaimed.

[21] Appl. No.: 664,344

[22] Filed: Mar. 4, 1991

[51] Int. Cl.$^5$ .............................................. B01D 15/08
[52] U.S. Cl. .................... 210/635; 210/656; 210/198.2; 210/502.1; 502/402; 502/157
[58] Field of Search ................. 210/656, 198.2, 502.1, 210/635

[56] References Cited

U.S. PATENT DOCUMENTS

| | | | |
|---|---|---|---|
| 4,045,353 | 8/1977 | Kosaka et al. | 210/502 |
| 4,245,005 | 1/1981 | Regnier et al. | 428/420 |
| 4,675,384 | 6/1987 | Dromard et al. | 210/263 |
| 4,822,593 | 4/1989 | Wilhelmy | 423/629 |
| 4,913,935 | 4/1990 | Lin | 427/221 |

OTHER PUBLICATIONS

Die Angewandte Mackromolekular Chemie 1971, 20, pp. 111-119—Schnecko, H. & Bieber, O.
Chromatographia, 1984, 18, 265-274; 1984, 19, 170-179; 1986, 351, 393-408—Schomburg, Kohler, Figge, Deege.

*Primary Examiner*—Patrick P. Garvin
*Assistant Examiner*—B. M. Peebles
*Attorney, Agent, or Firm*—Sheldon H. Parker

[57] ABSTRACT

A method of separating organic materials is disclosed utilizing a chromatographic packing material. This packing material includes a coated support material which is a chromatographically suitable substrate. An immobilized butadiene acrylonitrile polymer coating is provided on the substrate. The copolymer can be crosslinked by gamma radiation, or by means of a crosslinking agent such as dicumyl peroxide. The support material can be silica, alumina, diatomaceous earth, zeolite, porous glass or carbon, but preferably a spherical lamellar shaped crystals of aluminum hydroxide. the aluminum hydroxide crystals are bonded together at a central core and extend radially outward from a central core with a particle density ranging from 0.3 to 2.5 g/cm$^3$ and a diameter of 2 to 150 microns.

9 Claims, 3 Drawing Sheets

CHROMATOGRAPHIC PACKING MATERIAL HAVING FUNCTIONALIZED POLYMERIC COATING ON A SUBSTRATE

BACKGROUND OF THE INVENTION

Cross Reference to Related Applications

This application is related to copending patent application Ser. No. 664,366, filed Mar. 4, 1991, entitled Butadiene Acrylonitrile Polymeric Coating Chromatographic Packing Material, and having common assignee and common inventorship.

1. Field of the Invention

This invention relates to the immobilization and subsequent functionalization of a hydrocarbonaceous polymers on inorganic support materials for subsequent use as chromatographic stationary phases. More specifically, this invention relates to the coating of a polymer onto a metal oxide followed by in situ crosslinking of the polymer and chemical functionalization thereby producing stationary phases that exhibit unique chromatographic selectivities and excellent pH and chemical stability.

2. Prior Art

Chemically modified silica supports are currently the most widely used stationary phases for reversed-phase liquid chromatography. By reversed-phase chromatography it is meant that the adsorbent is less polar than the eluting solvent, and in normal phase chromatography the adsorbent is more polar than the eluting solvent. That is, in reversed-phase chromatography, the more non-polar sample components interact more with the relatively non-polar stationary phase and thus elute later than polar sample components. Typical mobile phases for reversed phased chromatography are aqueous buffers, water, methanol, acetonitrile, tetrahydrofuran, and mixtures of water or buffer with these organic solvents.

However, these chemically modified silica supports, in particular, alkyl-bonded silica-based materials suffer from two major limitations: first, residual silanol groups frequently have adverse effects on chromatographic performance, and second, silica-based materials are stable only over a pH range of 2-8.5. Polymeric supports exhibit enhanced pH stability but are often limited by their lack of structural rigidity and low efficiencies due to the poor diffusional properties of solutes in these materials.

As a result of the aforementioned difficulties, attention has been given to an approach that involves the deposition of a hydrophobic, chemically stable polymer onto the surface of an inorganic carrier followed by a radical-initiated cross-linking reaction which serves to immobilize a thin layer of polymer on the surface of the support. Methods for coating inorganic supports with polymers to create supports for chromatography are known. Schnecko and Bieber (Schnecko, H. and Bieber, O. Die Angewandte Mackromolekulare Chemie 1971, 20, 111-119) describe coating Chromosorb P with polymers including polybutadiene and hydroxy-terminated polybutadienes and nitrile rubber, as well as dibromo polybutadiene after amine treatment. The use of dicumyl peroxide is disclosed as an agent for subsequently crosslinking the polymers to create stationary phases for gas chromatography. This disclosure in inapplicable to the instant invention because of the differences between gas and liquid chromatography. For example, in modern high performance liquid chromatography (HPLC), pressures of several thousand $lb/in^2$ are often developed with the chromatography columns. The high pressure liquid within the column subjects the base material to conditions which are much more severe, or substantially different from those experienced in gas chromatography. Unlike liquid chromatography, gas chromatography can not be applied to the separation of solids, such as proteins and peptides, because they can not be entrained in the mobile gas phase.

Schomburg et al. (Schomburg, G.; Kohler, J; Figge, H.; Deege, A.; Bien-Vogelsang, U., Chromatographia 1984, 18, 265-274) report the immobilization of polymers on particles of silica and alumina using $^{60}Co$ irradiation to prepare stationary phases for liquid chromatography and describe further improvements in subsequent publications (including Bien-Vogelsang, U.; Deege, A.; Figge, H.; Khler, J.; Schomburg, G., Chromatographia 1984, 19, 170-179; Figge, H.; Deege, A.; Kohler, J.; Schomburg, G. J. Chromatography 1986, 351, 393-408; Kolla, P, Kohler, J. Schomburg, G. Chromatographia 1987, 23, 465-472).

Kosaka et al. (U.S. Pat. No. 4,054,353, Aug. 30, 1977) describe the radiation-induced crosslinking of monomers on the surface of inorganic substrates and simple chemical modification of some polymers, such as sulfonation of styrene. Berezkin et al. (Berezkin, V. G.; Kolbanovskii, Yu. A.; Kyazimov, E. A. Zh. Fiz. Khim. 1966, 40, 1921) also describe modifying supports by depositing monomers and crosslinking by irradiation.

Regnier et al. in a series of publications and in a patent (U.S. Pat. No. 4,245,005, Jan. 13, 1981) describe the adsorption of coatings, such as amines, to inorganic supports and then the crosslinking of the coatings by chemical means to create stationary phases suitable for ion-exchange chromatography.

A disadvantage of these methods is that they produce stationary phases which exhibit chromatographic behavior different from that of commonly-used, commercially-available materials. There is a great reluctance among those who practice chromatography to use stationary phases that exhibit unfamiliar behavior because the large existing body of knowledge developed based on the use of certain stationary phases is not applicable. Accordingly, it would be very desirable to have a stationary phase that exhibits chromatographic behavior similar to commonly-used, commercially-available materials, but which also exhibits improved chemical and mechanical stability to alleviate the deficiencies of inorganic supports coated with organosilanes and of polymeric supports. The materials described by this invention may be shown to exhibit excellent stability under acidic and basic conditions, high efficiency and good chromatographic selectivities especially for proteins and peptides.

SUMMARY OF THE INVENTION

In accordance with the present invention, chromatographic stationary phases are provided which consist of a functionalized thin layer of crosslinked polymer on an inorganic support. These materials are shown to overcome many of the disadvantages associated with chemically bonded metal oxides and polymeric materials. The composites herein described exhibit a high degree of pH and chemical stability while providing a surface chemistry that is ideally suited for the separation of classes of compounds such as proteins and peptides.

The process for preparing such chromatographic stationary phases involves the chemical modification of a polymer-coated inorganic support in order to produce a surface chemistry that is tailored to a particular chromatographic separation.

The chromatographic packing material is a coated chromatograhically suitable substrate, and immobilized functionalized coating on said substrate, said coating being a polymer having terminal vinyl group. Preferably the packing material is employed in reversed-phase chromatography. The polymer can be butadiene or a butadiene acrylonitrile copolymer, or other polymers, as well known in the art. The grafted moieties or monomeric groups can be octadecene or octene.

The support material can be any of the well known materials used for this purpose, as for example, silica, alumina, diatomaceous earth, zeolite or porous glass. Preferably, the support material is aluminum hydroxide particles, which are spherical lamellar shaped crystals. Preferably, the aluminum hydroxide crystals are bonded together at a central core and extend radially outwardly from a central core. The particle density can range from 0.3 to 2.5 and the particle diameter is from about 2 to 150 microns.

DESCRIPTION OF THE PREFERRED EMBODIMENTS

Figure 1A:
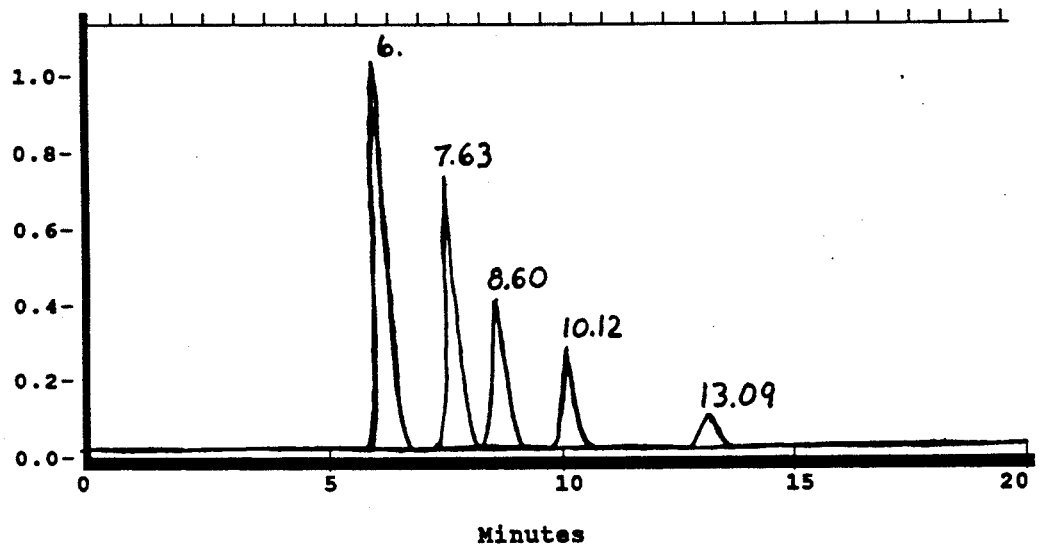
FIG. 1 shows the reversed-phase chromatographic performance of an octadecene-grafted polybutadiene-coated alumina before and after treatment with acid and base.

The chromatographic stationary phases comprise an inorganic carrier onto which has been coated, crosslinked and functionalized a layer of organic polymer. Typically, a monomer and additive, if used, are coated onto a polymer-coated inorganic support followed by irradiation using a $^{60}$Co source which serves to graft the monomer onto the polymer coating.

The inorganic carriers that may be used in the present invention include, but are not necessarily limited to silica, silica gels, glass, bentonite, carbon, hydroxyapatite, zirconia, titania and alumina, etc. The preferred carrier is alumina having an average pore size of 50-1000 Angstroms, a surface area of 5-250 m$^2$/g, preferably 40-100 m$^2$/g, and a particle size of 3-25 microns. The primary requirements for the inorganic carriers are that they be mechanically stable, essentially water insoluble and have sufficient surface area (>5 m$^2$/g) for the coating of a suitable amount of thin polymeric film.

Further details of carrier materials are found in the prior art, as for example U.S. Pat. No. 4,822,593, the disclosure of which is incorporated herein by reference, or in the book, "Packing and Stationary Phases in Chromatographic Technique" edited by K. K. Unger (Marcel Dekker, 1990).

The polymeric coating may be applied to the inorganic support by known methods referred to above. The organic polymers employed in the present invention include, but are not necessarily limited to poly(-butadiene), poly(butadiene-acrylonitrile) and others. The primary requirements for the polymers are that they be easily solubilized to facilitate the coating process and that they possess chemical functionalities, such as unsaturated carbon-carbon bonds, which allow crosslinking and the subsequent grafting of monomers to the polymer. The preferred polymeric coating consists of crosslinked polybutadiene.

The monomers, such as 1-octadecene, preferably contain unsaturation and do not contain chemical functionalities which are unstable in the pH range of 1-13. The amount of monomer used is 5-50% (w/w) relative to the amount of support used. To create a reversed-phase stationary phase suitable for the separation of peptides and proteins, the preferred monomer is 1-octadecene.

The additives are free radical initiators such as peroxides (e.g. dicumyl peroxide or benzoyl peroxide), or free radical stabilizers (such as allyl methacrylate or N-allyl acrylamide). The amount of additive used is 1-15% (w/w) relative to the amount of monomer used.

The grafting process is preferably carried out by mixing the monomer, additive and support for 5-15 minutes in a solvent that dissolves the monomer and additive, and then by removing the solvent by rotary evaporation at reduced pressure until the material is a relatively free-flowing powder. This step coats the support with the monomer and additive.

The grafting reaction can be carried out either at elevated temperatures, or by using gamma-irradiation either in the presence of air or nitrogen. If irradiation from a $^{60}$Co source is used, the total dose of radiation is preferably in the range of 1-10 MRad.

Following the grafting step, the supports should be washed with a suitable solvent, such as hexane, to remove unbound monomer and additives so that the material is suitable for chromatographic purposes. In the case of polymer-coated alumina materials, a solution of 1% glacial acetic acid in hexane is effective in removing unbound material and preventing subsequent leaching of unbound material during chromatography.

Specific details for the preparation of such materials and their use in chromatography are given in Examples 1-7 below.

EXAMPLE 1

This example describes the attachment of octadecene to polybutadiene-coated alumina by irradiation.

Octadecene (3.0 g) and allyl methacrylate (0.24 g) were dissolved in 50 mL of hexane. The solution was added to a 100-mL round-bottomed flask containing 10.0 g of alumina powder coated with polybutadiene (8 micron Unisphere®-PBD, Biotage, Inc., Charlottesville, Va.) and a magnetic stirring bar. The solution was stirred for 15 min and the solvent was removed by rotary evaporation at reduced pressure. The flask was evacuated, refilled with nitrogen, and capped.

The flask containing the coated powder was placed near a $^{60}$Co array and received a total dosage of $1.6 \times 10^7$ Rad during a period of 3 days.

Following irradiation, the sample was washed with 100 mL of a solution of hexane containing 1% of acetic acid and then with 100 mL or hexane. The product was dried at reduced pressure to give a powder which was packed into columns and used to effect the chromatographic separations described in Examples 2 and 3.

EXAMPLE 2

Description of chromatographic performance of the alumina-based C18 stationary phase.

Figure 1B:
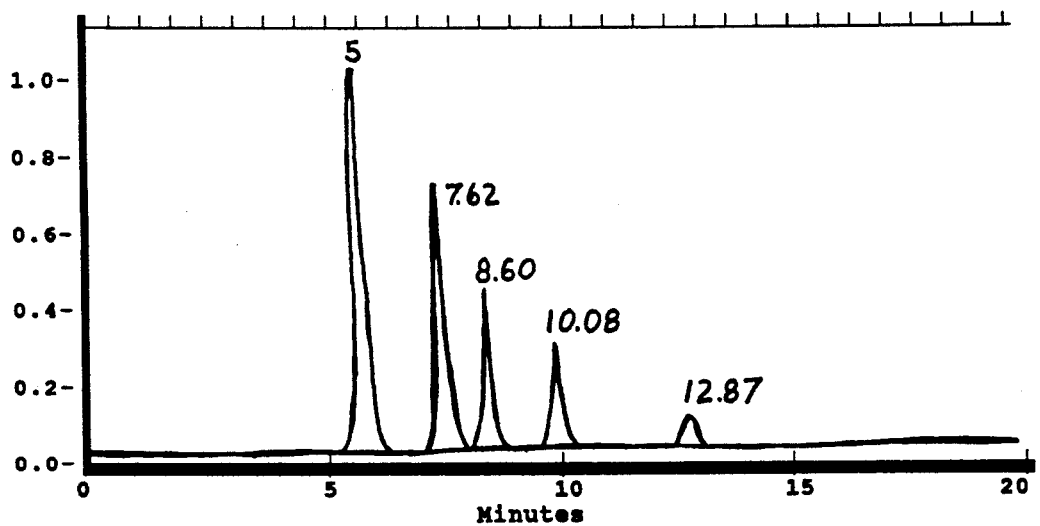

A 3.5 g quantity of polybutadiene-coated alumina prepared as in Example 1 above was packed into a 4.6 mm i.d.×250 mm stainless steel column using methanol at a pressure of 6000 psi. A test mixture consisting of theophylline, p-nitroaniline, methyl benzoate, phenetole, and o-xylene (1 mg/mL each in 50% aqueous acetonitrile) was prepared and injected onto the column. The test mixture components were eluted using a mobile phase of 45% water and 55% acetonitrile at a flow rate of 0.5 mL/min. The stationary phase was then subjected to alternate cycles of isocratic and gradient elution separations for 72 hours using triflouracetic acid (TFA)/water/acetontrile mobile phases. This was followed by washing with more than 100 column volumes each of 4% TFA in 50/50 water/acetonitrile and 0.1-M NaOH in 50/50 water/ethanol. This treatment resulted in losses of less than 1% in both retention and efficiency. The data is shown in FIG. 1.

EXAMPLE 3

Figure 2A:
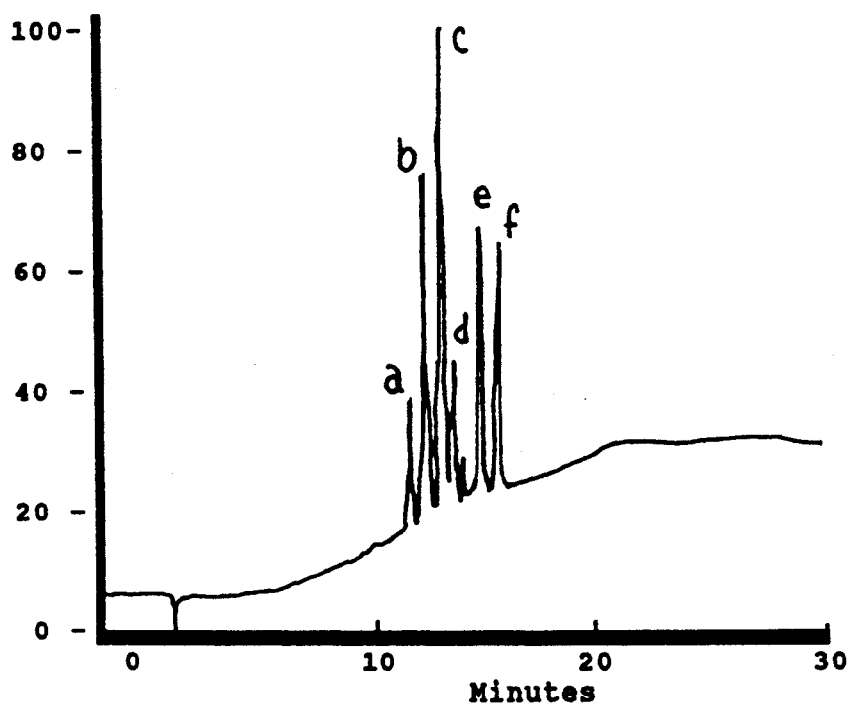
FIG. 2 shows the separation of a set of synthetic peptides on the herein described invention (A) and on a commercially available alkyl-bonded silica-based stationary phase (B).
Figure 2B:
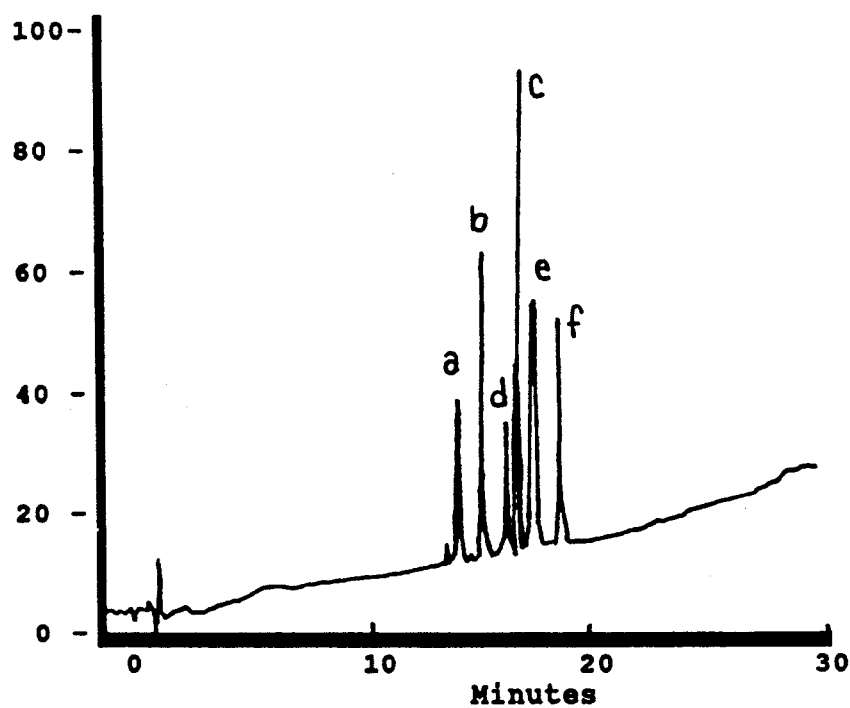
Figure 3A:
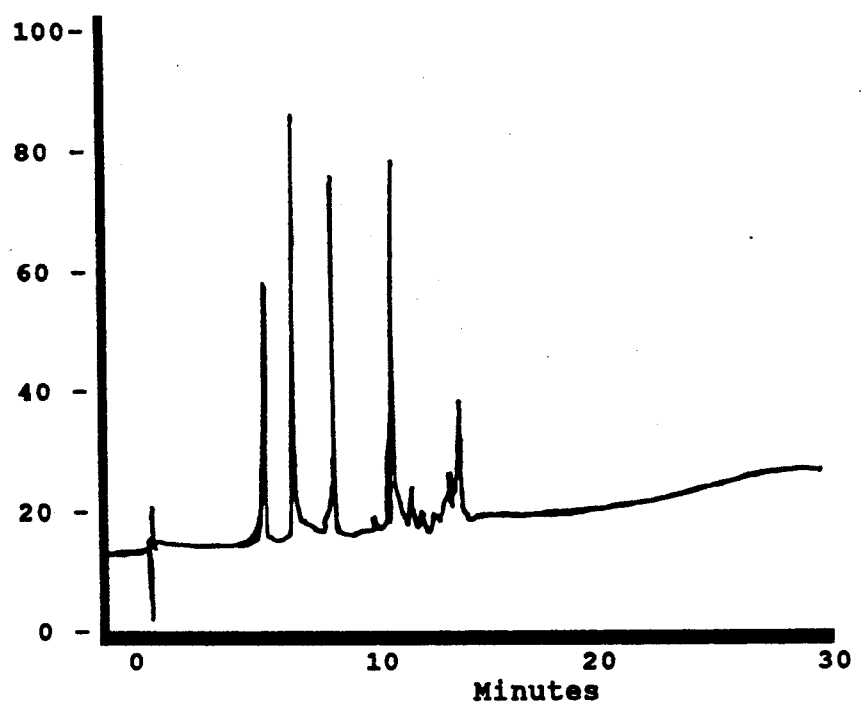
FIG. 3 shows the separation of a set of proteins on the herein described invention (A) and on a commercially available alkyl-bonded silica-based stationary phase (B).
Figure 3B:
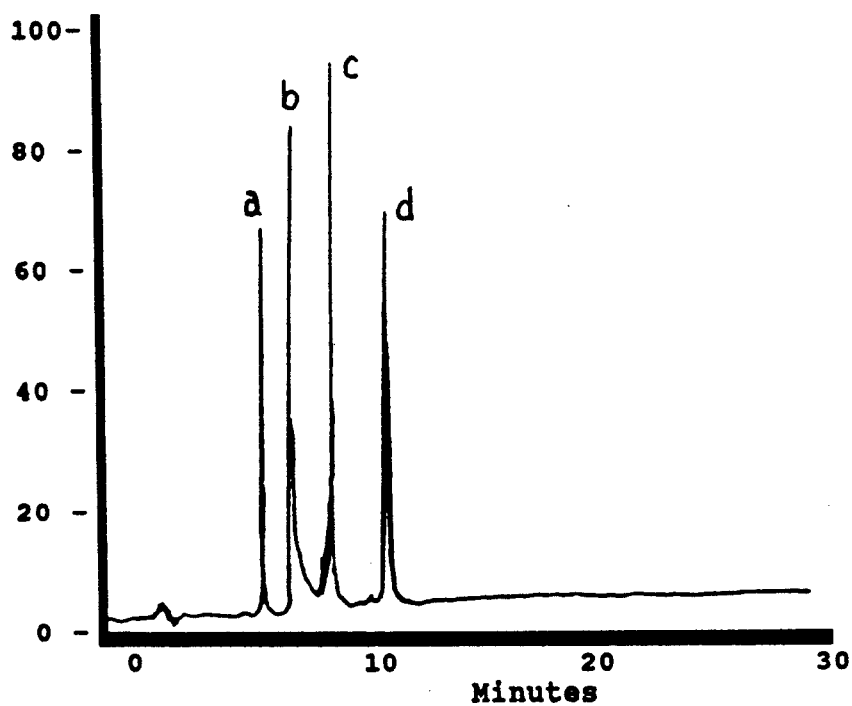

The chromatographic performance of the material described in Example 1 is further illustrated in FIGS. 2 and 3. The conditions for the separation are described in the figure captions. As can be seen from the figures, the chromatographic performance on the invention compares quite favorably with that of a widely-used, commercially available silica-based column. The combination of chromatographic performance and pH stability makes the present invention far superior to any comparable material currently available.

EXAMPLE 4

1-Octadecene (4.5 g) and allyl acrylamide (0.75 g) were dissolved in 50 mL of ethyl acetate. 15.0 g of alumina powder coated with polybutadiene (8 micron Unisphere ®-PBD, Biotage, Inc., Charlottesville, Va.) was added to the solution, which was then shaken for 10 minutes. Following evaporation of the solvent by rotary evaporation at reduced pressure, the flask was evacuated and refilled with nitrogen. The evacuation/refilling procedure was repeated twice and the flask was capped.

The flask containing the coated powder was placed near a $^{60}$Co array and received a total dosage of $1.5 \times 10^7$ Rad during a period of 76 h.

Following irradiation, the sample was washed with 50 mL of hexane, then 100 mL of hexane containing 1% of glacial acetic acid, then with 50 mL of hexane. The product was dried at reduced pressure to give a powder which was packed into columns and used to effect chromatographic separations described in Example 2. The retention time of o-xylene was 13.6 min.

EXAMPLE 5

The procedure according to Example 1 is carried out, with exception that 1-octene is used in place of 1-octadecene. The material is used to effect separations and the retention times of o-xylene and angiotensin II are less than that obtained using material from Example 1.

EXAMPLE 6

The procedure according to Example 1 was carried out, but the reaction was not carried out under an atmosphere of nitrogen. The retention time of o-xylene was 13.5 min. and that of angiotensin II was 24 min.

EXAMPLE 7

The procedure according to Example 1 was carried out but the amount of allylmethacrylate was reduced to 5% and the reaction was not carried out under an atmosphere of nitrogen. The retention time of o-xylene was 13.1 and that of angiotensin II was 22 min.

What is claimed is:

1. Method of separating organic materials, said method comprising the steps of providing a bed of packing material selected from the group consisting of silica and alumina, said packing material having bonded thereto, a polymeric coating, said coating having a uniform immobilized functionalized group, said group having terminal vinyl groups.

2. The method of claim 1, wherein said packing material is spherical aluminum hydroxide particles.

3. The method of claim 2, wherein said support material is spherical lamellar shaped crystals of aluminum hydroxide.

4. The method of claim 3, wherein said aluminum hydroxide crystals are bonded together at a central core and extend radially outwardly from a central core.

5. The method of claim 4, wherein the particle density rages from 0.3 to 2.5.

6. The method of claim 5, wherein said particles have a diameter of 2 to 150 microns.

7. The method of claim 6, wherein said polymer is a butadiene acrylonitrile copolymer.

8. The method of claim 5, wherein said terminal vinyl groups are octadecene.

9. The method of claim 5, wherein said terminal vinyl groups are octene.

* * * * *